United States Patent [19]

Takeda et al.

[11] Patent Number: 5,690,579
[45] Date of Patent: Nov. 25, 1997

[54] PLANETARY GEAR TRANSMISSION

[75] Inventors: Tomokazu Takeda, Shiki; Takashi Hotta, Asaka, both of Japan

[73] Assignee: Honda Giken Kogyo Kabushiki Kaisha, Tokyo, Japan

[21] Appl. No.: 597,013

[22] Filed: Feb. 5, 1996

[30] Foreign Application Priority Data

Feb. 6, 1995 [JP] Japan ................... 7-041377

[51] Int. Cl.$^6$ ...................... F16H 3/44
[52] U.S. Cl. ............ 475/281; 475/280; 475/285
[58] Field of Search .................. 475/280, 281, 475/284, 285

[56] References Cited

U.S. PATENT DOCUMENTS

| | | | |
|---|---|---|---|
| 3,987,690 | 10/1976 | Murakami et al. | 74/759 |
| 5,030,187 | 7/1991 | Asada | 475/285 X |
| 5,090,952 | 2/1992 | Asada | 475/285 X |
| 5,122,103 | 6/1992 | Nakawaki et al. | 475/284 X |
| 5,176,592 | 1/1993 | Nakawaki et al. | 475/284 X |
| 5,203,234 | 4/1993 | Asada et al. | 475/284 X |
| 5,222,923 | 6/1993 | Hotta et al. | 475/276 |
| 5,226,862 | 7/1993 | Hattori | 475/286 |
| 5,254,053 | 10/1993 | Taniguchi et al. | 475/276 |
| 5,277,673 | 1/1994 | Nakayama et al. | 475/276 X |
| 5,342,257 | 8/1994 | Hotta et al. | 475/275 |
| 5,478,291 | 12/1995 | Morisawa et al. | 475/281 X |
| 5,525,117 | 6/1996 | Morisawa et al. | 475/281 |

FOREIGN PATENT DOCUMENTS

| | | |
|---|---|---|
| 0381537 | 8/1990 | European Pat. Off. |
| 1320362 | 12/1989 | Japan . |
| 4501455 | 3/1992 | Japan . |
| 9004732 | 3/1990 | WIPO . |

OTHER PUBLICATIONS

European Search Report Application No. EP 96 30 0748 Completion Date 26 Apr. 1996.

English language Abstract of JP 1-320362.

*Primary Examiner*—Charles A. Marmor
*Assistant Examiner*—Peter T. Kwon
*Attorney, Agent, or Firm*—Lyon & Lyon LLP

[57] ABSTRACT

A planetary gear transmission comprises a first planetary gear train of double pinion type G1 and second and third planetary gear trains of single pinion type G2 and G3 disposed coaxially and in parallel with one another. In this transmission, a first sun gear S1 is coupled to an input member 11 through a first clutch K1, and a first brake B1 is provided for the purpose of selectively holding the first sun gear S1 against rotation. First and second carriers C1 and C2 and a third ring gear R3 are coupled to one another, and these three elements are coupled to the input member 11 through a second clutch K2, and a second brake B2 is provided for the purpose of selectively holding these three elements against rotation. A first ring gear R1 and a second ring gear R2 are coupled with each other, and a third brake B3 is provided for the purpose of selectively holding these two elements against rotation. Second and third sun gears S2 and S3 are coupled with each other, and these two elements are coupled to the input member 11 through a third clutch K3. A third carrier C3 is directly coupled to an output member 12.

10 Claims, 5 Drawing Sheets

Fig. 4

| RANGE | K1 | K2 | K3 | B1 | B2 | B3 | RATIO |
|-------|----|----|----|----|----|----|-------|
| LOW   |    |    | ○  |    | (○)|    | 3.597 |
| 2ND   |    |    | ○  |    |    | ○  | 2.100 |
| 3RD   |    |    | ○  |    |    |    | 1.503 |
| 4TH   |    | ○  | ○  |    |    |    | 1.000 |
| 5TH   |    | ○  |    | ○  |    |    | 0.806 |
| REV   | ○  |    |    |    | ○  |    | 4.166 |

# 5,690,579

PLANETARY GEAR TRANSMISSION

FIELD OF THE INVENTION

The present invention relates to a planetary gear transmission having three planetary gear trains.

BACKGROUND OF THE INVENTION

Planetary gear transmissions are widely used as an automatic transmission in automobiles. Many conventional planetary gear transmissions comprise an integral combination of two planetary gear trains such as the Ravigneaux gear train and the Simpson gear train. In addition to such planetary gear transmission integrating two gear trains, planetary gear transmissions comprising three planetary gear trains are disclosed in Japanese Laid-Open Patent Publication No. 1(1989)-320362 and in Japanese Laid-Open (PCT) No. 4(1992)-501455. In these transmissions, the planetary gear trains are combined with a plurality of clutches and brakes for the purpose of attaining a plurality of forward gear positions and a single reverse gear position.

When a plurality of forward gear positions, e.g., five or more positions, are required; transmissions having three planetary gear trains are popular at present because they are effectively constructed with a relatively small number of clutches and brakes. For example, the transmission disclosed in the above Japanese Laid-Open Patent Publication No. 1-320362 has three single-planet type planetary gear trains and a total of six clutches and brakes for attaining five forward gear positions and a single reverse gear position.

Even though these transmissions comprising three planetary gear trains have a small number of clutches and brakes, because of one extra train, they tend to have a greater axial length than those comprising only two planetary gear trains. However, if the clutches and brakes are arranged around the periphery of the planetary gear trains instead of being disposed axially next to one another, then the axial length of the transmission can be made smaller.

In the transmission disclosed in the above Japanese Laid-Open Patent Publication No. 1-320362, a first ring gear element composing a first planetary gear train is coupled with a third ring gear element composing a third planetary gear train, and a second ring gear element composing a second planetary gear train is coupled to a third carrier element composing the third planetary gear train. This construction of the transmission requires that a member (first connecting member) connecting the first ring gear element with the third ring gear element be disposed outside a member (second connecting member) connecting the second ring gear element to the third carrier element, thus presenting a problem of the first connecting member having a large outside diameter. For the purpose of making the axial size of the transmission small, if the clutches and brakes were placed around this first connecting member, which has a relatively large diameter; then the radial size of the transmission would become quite large, which would be another problem.

In the transmission disclosed in the above Japanese Laid-Open (PCT) No. 4-501455, the ring gear element of the first planetary gear train is coupled to the carrier element of the second planetary gear train, and the carrier element of the first planetary gear train is coupled to to the ring gear element of the second planetary gear train. This design, which disposes connecting members for coupling these elements radially one around the other, also presents the above problem.

SUMMARY OF THE INVENTION

The present invention is to solve these problems. Thus, it is an object of the present invention to provide a small and compact planetary gear transmission comprising three planetary gear trains, with at least five forward gear positions.

It is another object of the present invention to provide a planetary gear transmission comprising three planetary gear trains, with a design of small radial size.

It is yet another object of the present invention to provide a planetary gear transmission comprising three planetary gear trains, with a design of small axial size and small radial size.

In order to achieve these objects, the present invention provides a planetary gear transmission having a first planetary gear train of double-pinion type, a second planetary gear train of single-pinion type, and a third planetary gear train of single-pinion type, each disposed coaxially and in parallel with one another. The first planetary gear train includes a first sun gear element, a first carrier element, and a first ring gear element; the second planetary gear train includes a second sun gear element, a second carrier element, and a second ring gear element; and the third planetary gear train includes a third sun gear element, a third carrier element, and a third ring gear element. The first sun gear element is engageably and disengageably coupled to an input member through a first clutch, and a first brake is provided capable of holding the first sun gear element against rotation. The first and second carrier elements and the third ring gear element are coupled to one another, and these three elements are engageably and disengageably coupled to the input member through a second clutch, and a second brake is provided capable of holding these three elements against rotation. Furthermore, the first and second ring gear elements are coupled with each other, and a third brake is provided capable of holding these two elements against rotation. The second and third sun gear elements are coupled with each other, and these two elements are engageably and disengageably coupled to the input member through a third clutch. In addition, the third carrier element is directly coupled to an output member.

This transmission has the first ring gear element coupled with the second ring gear element and the first carrier element with the second carrier element such that only the member connecting the first ring gear element with the second ring gear element can have a diameter greater than those of the first and second ring gear elements in the vicinity of the first and second planetary gear trains. Also, the second carrier element is coupled to the third ring gear element, and the third carrier element is directly connected to the output member. As such, only the member connecting the second carrier element to the third ring gear element can have a diameter greater than those of the second and third ring gear elements in the vicinity of the second and third planetary gear trains. Therefore, if the outer diameters of these connecting members are made as small as possible and the clutches and brakes are disposed around the connecting members (i.e., around the ring gear elements), the transmission can be designed with a relatively small length in the axial direction, with little compromise of the radial size.

Furthermore, the first and second ring gear elements can be formed in one body by broaching, etc. in one production process, thereby omitting a welding process, for producing unified first and second gear elements.

In the transmission, the first, second, and third planetary gear trains are disposed axially adjacent to one another; and the first, second, and third clutches and the first brake are disposed on one side of the three planetary gear trains in the axial direction, and the second and third brakes are disposed on the other side. In addition, the second and third clutches are each disposed at a substantially same axial position and are overlaid radially one over the other; and the first clutch and the first brake are disposed axially adjacent to each other around the second and third clutches. Furthermore, the second and third brakes are each disposed at a substantially same axial position and are overlaid radially one over the other. Preferably, at least the first clutch or the first brake is disposed around the first, second, or third ring gear element. In this construction, the clutches and brakes are integrally and compactly disposed on both sides of the three planetary gear trains. Two clutches are disposed radially overlying one over the other, and two brakes are also disposed in the same manner. In addition, the first clutch and the first brake, or at least one of them, are disposed around the ring gear elements. As a result, the transmission has a comparatively small size in the axial direction with respect to transmissions having clutches and brakes disposed axially adjacent to one another.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 4 is a table showing the relation of the operation of the clutches and brakes to the gear positions of the transmission;

DETAILED DESCRIPTION OF THE PREFERRED EMBODIMENTS

Figure 1:
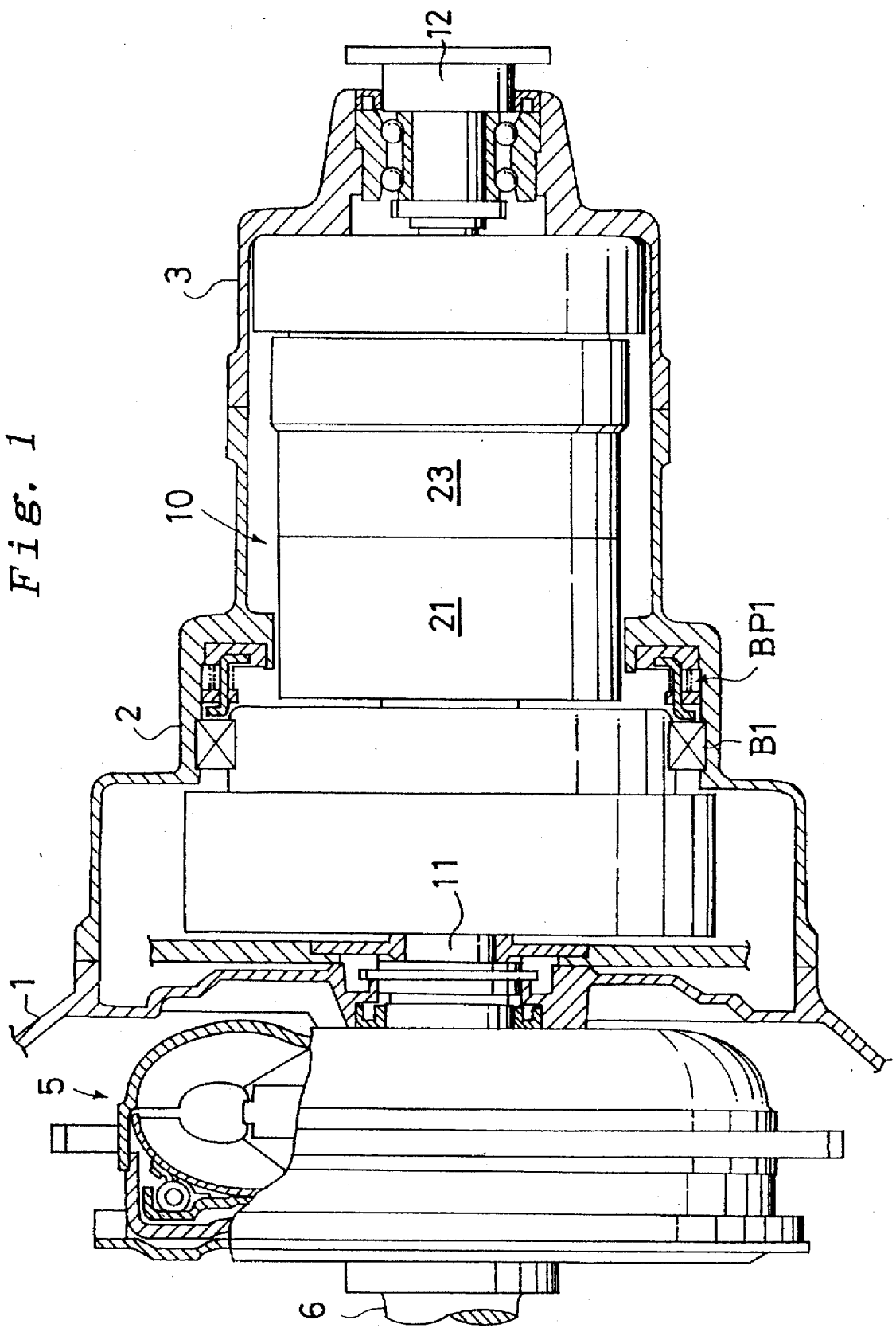
FIG. 1 is an overview of a planetary gear transmission according to an embodiment of the present invention.
Figure 2:
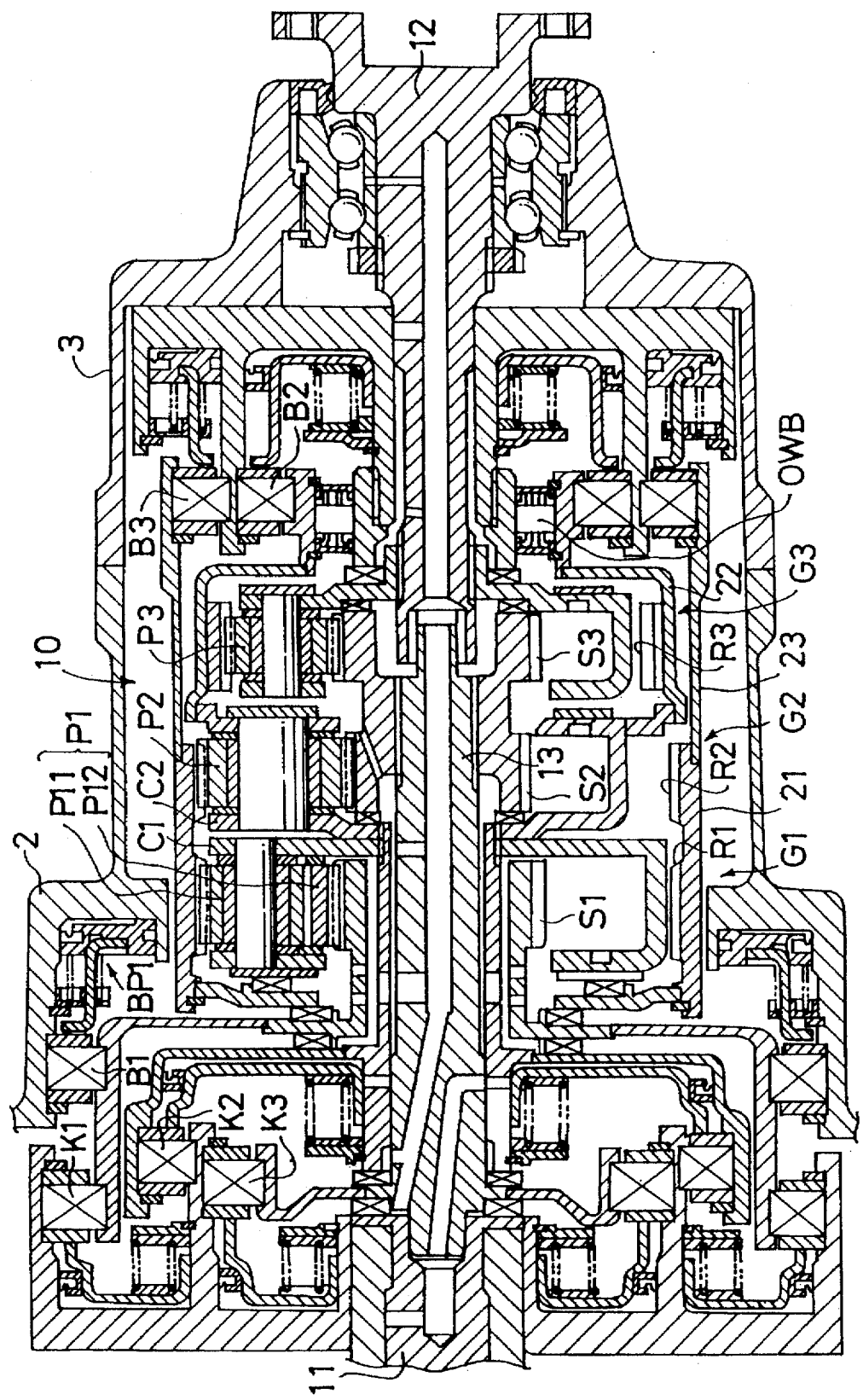
FIG. 2 is a sectional view showing the shift mechanism of the transmission.
Figure 3:
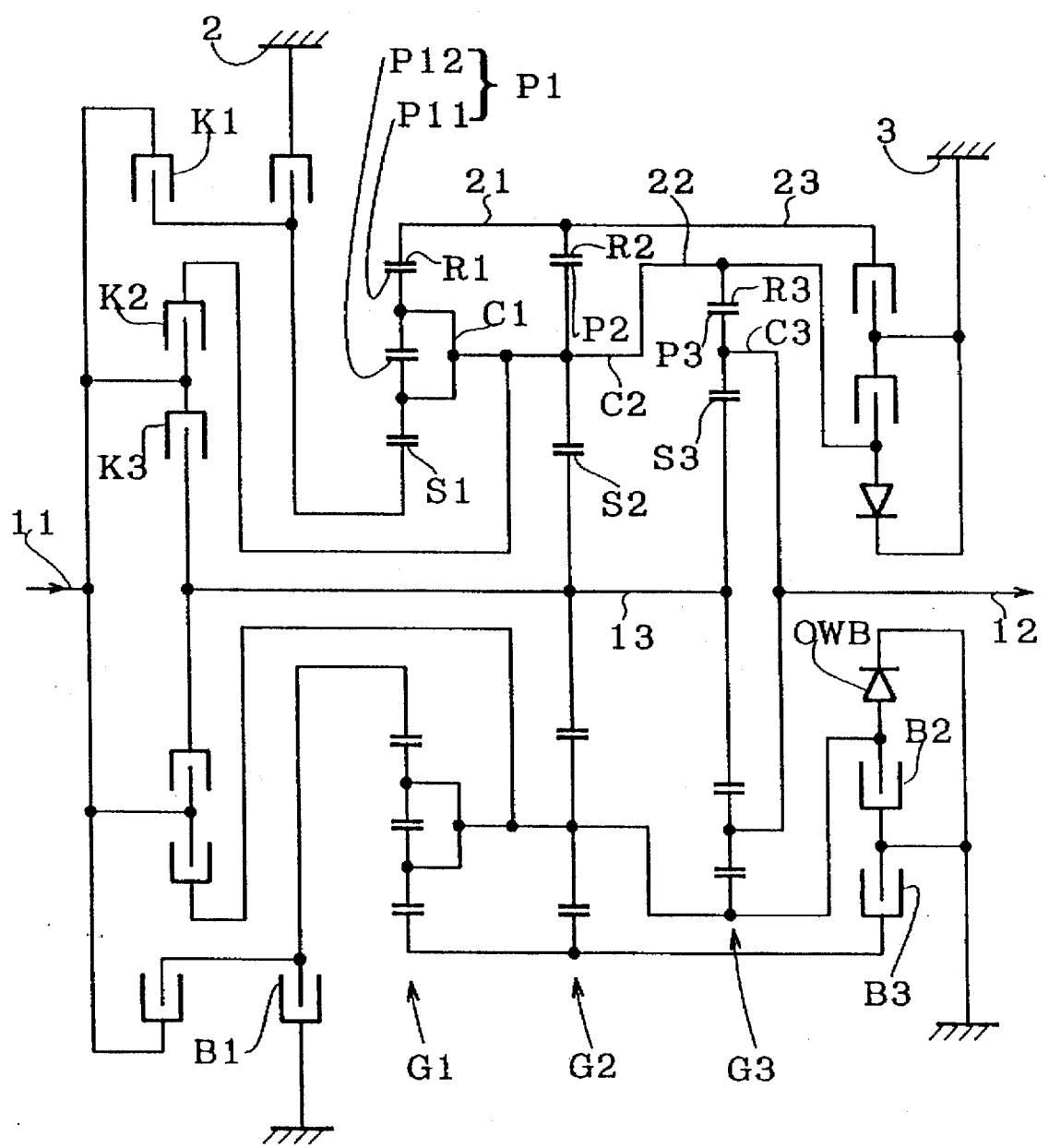
FIG. 3 is a skeleton diagram showing power-transmission routes of the transmission.

FIG. 1 shows the whole construction of a planetary gear transmission (automatic transmission) according to the present invention, which can be incorporated into automobiles. FIG. 2 shows the shift mechanism of the transmission in enlargement, and FIG. 3 shows a skeletal diagram of the mechanism.

As shown in FIG. 1, this transmission generally comprises a torque converter 5, which is coupled to the output shaft 6 of the engine, and a shift mechanism 10 in a three partite housing 1, 2, and 3. The shift mechanism 10 transmits power from the input shaft 11 connected to the turbines of the torque converter 5 to an output shaft 12 while varying the rotational speed ratio. The right-side end of the output shaft 12 extruding through the right end of the housing 3 is coupled to a propeller shaft, which is not shown here. Through this propeller shaft, power is transmitted from the out put shaft 12 further to a differential mechanism and an axle shaft (i.e., drive wheels), both of which are also not shown in the figure.

As shown in FIG. 2, the input shaft 11 is disposed on the left side of the shift mechanism 10; the output shaft 12 is disposed coaxially with the input shaft 11 on the right side of the mechanism 10; and a countershaft 13 is provided coaxially with and between the input and output shafts 11 and 12. Mounted on this counter shaft 13 are, from the left, first, second, and third planetary gear trains G1, G2, and G3, which are disposed coaxially, in parallel with and adjacent to one another. The planetary gear trains G1, G2, and G3 have respective first, second, and third sun gears S1, S2, and S3, which are positioned centrally; respective first, second, and third planetary pinions P1, P2, and P3, which mesh with the sun gears S1, S2, and S3, respectively, and rotate about their own axes while revolving around the sun gears; respective first, second, and third carriers C1, C2, and C3, which support the respective planetary pinions P1, P2, and P3 rotatably and rotate therewith around the sun gears S1, S2, and S3, respectively; and respective first, second, and third ring gears R1, R2, and R3, whose internal gear teeth mesh with the planetary pinions P1, P2, and P3, respectively.

Among these planetary gear trains, the second and third planetary gear trains G2 and G3 are single-pinion type. However, the first planetary gear train G1 is double-pinion type. Therefore, the first pinion P1 has two pinion gears P11 and P12. One pinion gear P12 meshes with the first sun gear S1, and the other P11 meshes with this pinion gear P12 and the first ring gear R1.

The shift mechanism 10 further comprises first, second, and third clutches K1, K2, and K3; first, second, and third brakes B1, B2, and B3; and a one-way brake OWB. Each clutch or brake except the one-way brake OWB is actuated for engagement when the piston cylinder provided for each is supplied with a hydraulic pressure, and it is disengaged by a spring when the pressure is released.

These three clutches K1, K2, and K3 and the first brake B1 are integrally disposed on the left side of the three planetary gear trains. On the other hand, the second and third brakes B2 and B3 are integrally disposed on the right side of the three planetary gear trains. With the clutches and brakes placed on both side of the planetary gear trains, the design of the transmission is compact. Furthermore, the second and third clutches K2 and K3 are each disposed at a substantially same axial position and radially overlaid one over the other (the second clutch K2 being outside the third clutch K3). Around these clutches K2 and K3, the first clutch K1 and the first brake B1 are disposed axially adjacent to each other. In a similar manner, the second and third brakes B2 and B3 are each disposed at a substantially same axial position and are radially overlaid one over the other (the second brake B2 being inside the third brake B3). As a result, the shift mechanism 10 (and the whole transmission) has a relatively small axial size in comparison with transmissions having clutches and brakes disposed axially adjacent to one another.

The piston mechanism BP1, which is a part of the first brake B1, is disposed around the first planetary gear train G1 (i.e., first ring gear R1), not axially adjacent to each other. With this positional arrangement, the shift mechanism 10 is also axially compacted. In this embodiment of the present invention, part of the first brake B1 is disposed around the first ring gear R1. However, the whole first brake B1, even together with the first clutch K1, can be disposed around the first and second ring gears R1 and R2.

As shown in FIG. 3, the first sun gear S1 is selectively engaged to and disengaged from the input shaft 11 by the first clutch K1 or held to the housing 2 against rotation by the first brake B1. The first and second carriers C1 and C2 and the third ring gear R3 are coupled to one another, and they are selectively engaged to and disengaged from the input shaft 11 by the second clutch K2 or held to housing 3 against rotation by the second brake B2. The one-way brake OWB is disposed in parallel with the second brake B2, and it is capable of holding the first and second carriers C1 and C2 and the third ring gear R3 to the housing 3 against rotation in one direction. The first ring gear R1 and the second ring gear R2 are coupled with each other, and they can be held to the housing 3 against rotation by the third brake B3. The second sun gear S2 and the third sun gear S3 are coupled with each other, and they are selectively engaged to and disengaged from the input shaft 11 by the third clutch K3. The third carrier C3 is directly connected to the output shaft 12.

As shown in FIG. 2, the first and second ring gears R 1 and R2, each having a same number of teeth, are formed in one body inside a tubular member 21 (hereinafter referred to as "first connecting member"). Thus, these ring gears R1 and R2 can be formed inside this first connecting member 21 in one production process, e.g., by broaching, so it is not necessary that these ring gears be separately formed and later be welded together.

There is nothing between the peripheral surface of the first connecting member 21 (i.e., first ring gear R1) and the piston mechanism BP1, which is a part of the first brake B1 and disposed around the first connecting member 21. Therefore, the first brake B1 is disposed close to the peripheral surface of the connecting member 21 so that the transmission has a relatively small outer diameter. In this way, with little compromise of compactness in the radial direction, the transmission as a whole has a relatively small axial size as described previously.

Furthermore, another tubular member (second connecting member) 22 is compactly provided around the third ring gear R3 for the purpose of connecting the third ring gear R3 to the second carrier C2. In addition, a retaining member 23 is disposed, extending from the first connecting member 21 around this second connecting member 22 (i.e., third ring gear R3) for the purpose of retaining the third brake B3. With this compact arrangement, the radial size of the transmission is not adversely affected much.

As described above, the shift mechanism 10 is composed of the planetary gear elements including the first, second, and third sun gears S1, S2, and S3; the first, second, and third carriers C1, C2, and C3; the first, second, and third ring gears R1, R2, and R3; and the input shaft 11, counter shaft 13, and the output shaft 12. In this shift mechanism 10, gearshifts or gear positions are controlled and established by selectively engaging and disengaging the first, second, and third clutches K1, K2, and K3 and the first, second, and third brakes B1, B2, and B3. More specifically, five forward gear positions or speed ranges (LOW, 2ND, 3RD, 4TH, and 5TH) and one reverse gear position or range (REV) are established by engaging and disengaging the clutches and brakes in combination as shown in FIG. 4. In FIG. 4, the clutches and brakes indicated by a circle are engaged. Among these circles, the circle indicating the second brake B2 in the LOW range is placed in parentheses. The reason is that power will be transmitted through the one-way brake OWB in the LOW range even if the second brake B2 is not engaged. In other words, even if the second clutch K2 is not engaged, if the third clutch K3 is engaged, then power will be transmitted in the LOW range. However, power transmission is not possible in the direction opposite to that of the drive side. As such, when the second brake B2 is disengaged, engine brake is not available in the LOW range. On the other hand, when the second brake B2 is engaged, engine brake is operable in the LOW range.

Figure 5:
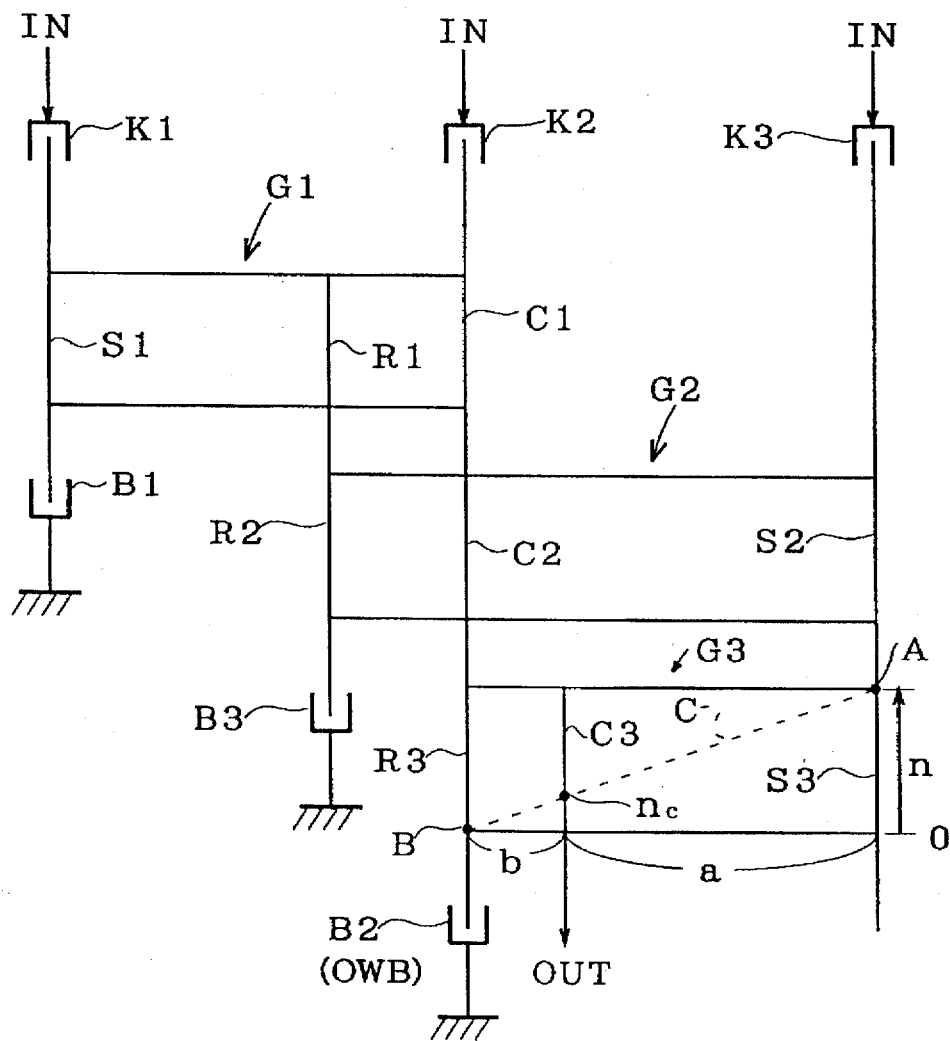
FIG. 5 is a diagram showing the relation in rotational speed among the elements of the transmission.

FIG. 5 is a diagram showing the relation in rotational speed among the various elements of the transmission. The speed-reduction ratios of the speed ranges will be described below with reference to this diagram.

In the diagram, the first, second, and third planetary gear trains G1, G2, and G3 are separately plotted, and the vertical lines in the respective planetary gear trains indicate the elements thereof and have lengths representing the rotational speeds of the elements. The distances between the vertical lines are proportional to the reciprocals of the numbers of teeth of the respective sun gears and ring gears. The clutches K1, K2, and K3 and the brakes B1, B2, and B3 are shown adjacent to the respective elements, which are selectively engaged thereby.

For example, the three vertical lines shown in the third planetary gear train G3 correspond to the third sun gear S3, the third carrier C3, and the third ring gear R3, respectively, from the right. The upward lengths of these vertical lines indicate the rotational speeds "n" of these elements in the forward direction. The distance "a" between the vertical line indicating the third sun gear S3 and the vertical line indicating the third carrier C3 corresponds to the reciprocal ($=1/Zs$) of the number $Zs$ of teeth of the third sun gear S3. The distance "b" between the vertical line indicating the third carrier C3 and the vertical line indicating the third ring gear R3 corresponds to the reciprocal ($=1/Zr$) of the number $Zr$ of teeth of the third ring gear R3. While the third sun gear S3 coupled to the input shaft 11 by the engagement of the third clutch K3 rotates at a rotational speed "n", if the third ring gear R3 is held against rotation by the second brake B2, the third carrier C3 will rotate at a rotational speed "nc" which is indicated by the point of intersection between the vertical line indicating the third carrier C3 and the line C which interconnects the point A indicating the rotating condition of the third sun gear S3 and the point B indicating the fixed condition of the third ring gear R3.

The first and second planetary gear trains G1 and G2 are also described in the same manner. The three vertical lines in the first planetary gear train G1 correspond to the first sun gear S1, the first ring gear R1, and the first carrier C1, from the left.

Figure 6:
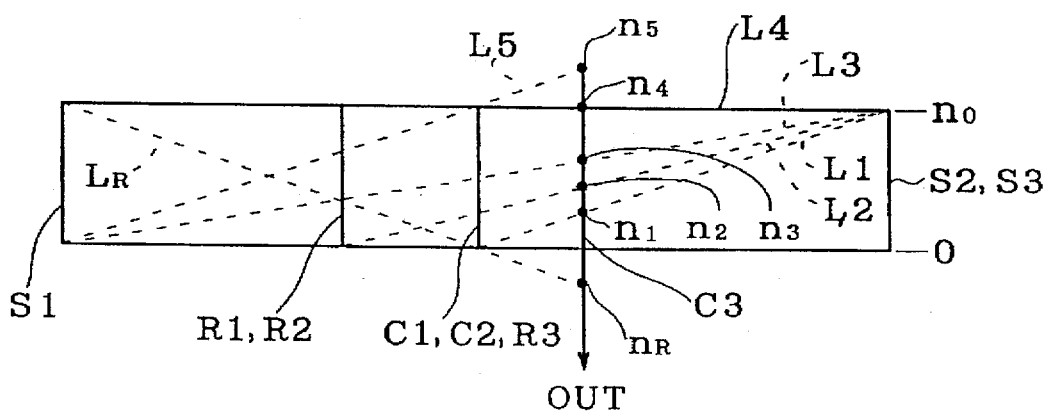
FIG. 6 is another diagram showing the relation in rotational speed among the elements of the transmission.

The first ring gear R1 and the first carrier C1 composing the first planetary gear train G1 are coupled with the second ring gear R2 and the second carrier C2 composing the second planetary gear train G2, respectively. In addition, the second carrier C2 and the second sun gear S2 composing the second planetary gear train G2 are coupled to the third ring gear R3 and the third sun gear S3 composoing the third planetary gear train G3, respectively. Therefore, the diagram in FIG. 5 showing the speed relation of the elements in three separate blocks can be redrawn integrally as in FIG. 6. With reference to FIG. 6, the rotational speed ratio of the output shaft 12 to the input shaft 11, i.e., the speed-reduction ratio, will be described for each speed range.

In the first gear position or LOW range, the third clutch K3 and the second brake B2 are engaged (or only the third clutch K3 is engaged as the one-way brake OWB is effective). As a result, the second and third sun gear S2 and S3 rotate at the same rotational speed n0 as the input shaft 11, and the first and second carriers C1 and C2 and the third ring gear R3 are held against rotation. The third carrier C3 rotates at a rotational speed n1 which is indicated by the point of intersection between the vertical line indicating the third carrier C3 and the dotted line L1 which interconnects the point indicating the rotating conditions of the second and third sun gears S2 and S3 and the point indicating the fixed conditions of the first and second carriers C1 and C2 and the third ring gear R3. Thus, the output shaft 12, which is directly connected to the third carrier C3, rotates at the rotational speed n1 with a speed-reduction ratio decided by the rotational speed ratio of the input shaft to the output shaft (=n0/n1).

In the second gear position, the third clutch K3 and the third brake B3 are engaged. The second and third sun gears S2 and S3 rotate at the same rotational speed n0 as the input shaft 11, and the first and second ring gears R1 and R2 are held against rotation. The output shaft 12 rotates at a rotational speed n2 which is indicated by the point of intersection between the vertical line indicating the third carrier C3 and the dotted line L2 which interconnects the point indicating the rotating conditions of the second and third sun gears S2 and S3 and the point indicating the fixed conditions of the first and second ring gears R1 and R2. The speed-reduction ratio in this gear position is determined by the rotational speed ratio of the input shaft to the output shaft (=n0/n2).

In the third gear position, the third clutch K3 and the first brake B1 are engaged. The second and third sun gears S2 and S3 rotate at the same rotational speed n0 as the input shaft 11, and the first sun gear S1 is held against rotation. The output shaft 12 rotates at a rotational speed n3 which is indicated by the point of intersection between the vertical line indicating the third carrier C3 and the dotted line L3 which interconnects the point indicating the rotating conditions of the second and third sun gears S2 and S3 and the point indicating the fixed condition of the first sun gear S1. The speed-reduction ratio in this gear position is determined by the rotational speed ratio of the input shaft to the output shaft (=n0/n3).

In the fourth gear position, the second and third clutches K2 and K3 are engaged. The first, second, and third planetary gear trains G1, G2, and G3 rotate in unison at the same rotational speed n0 as the input shaft 11, and the first sun gears S1 is held against rotation. The output shaft 12 rotates at a rotational speed n4 which is indicated by the point of intersection between the vertical line indicating the third carrier C3 and the upper horizontal line L4. The speed-reduction ratio is 1.

In the fifth gear position, the second clutch K2 and the first brake B1 are engaged. The first and second carriers C1 and C2 and the third ring gear R3 rotate at the same rotational speed n0 as the input shaft 11, and the first sun gear S1 is held against rotation. The output shaft 12 rotates at a rotational speed n5 which is indicated by the point of intersection between the vertical line indicating the third carrier C3 and the extending dotted line L5 which interconnects the point indicating the rotating conditions of the first and second carriers C1 and C2 and the third ring gear R3 and the point indicating the fixed condition of the first sun gear S1. The speed-reduction ratio in this gear position is determined by the rotational speed ratio of the input shaft to the output shaft (=n0/n5).

In the reverse gear position or REV range, the first clutch K1 and the second brake B2 are engaged. As a result, the first sun gear S1 rotates at the same rotational speed n0 as the input shaft 11, and the first and second carriers C1 and C2 and the third ring gear R3 are held against rotation. The output shaft 12 rotates at a rotational speed nR which is indicated by the point of intersection between the vertical line indicating the third carrier C3 and the extending dotted line LR which interconnects the point indicating the rotating condition of the first sun gear S1 and the point indicating the fixed conditions of the first and second carriers C1 and C2 and the third ring gear R3. The speed-reduction ratio in this gear position is determined by the rotational speed ratio of the input shaft to the output shaft (=n0/nR).

These speed-reduction ratios in the respective speed ranges vary depending on the numbers of teeth of the gears, so the values listed as ratios in FIG. 4 are given only as a reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A planetary gear transmission comprising:
   a first planetary gear train of double pinion type with a first sun gear element, a first carrier element, and a first ring gear element; a second planetary gear train of single pinion type with a second sun gear element, a second carrier element, and a second ring gear element; and a third planetary gear train of single pinion type with a third sun gear element, a third carrier element, and a third ring gear element; said first to third planetary gear trains being disposed coaxially and in parallel with one another; and characterized by:
   that said first sun gear element is engageably and disengageably coupled to an input member through a first clutch, and a first brake is provided capable of holding said first sun gear element against rotation;
   that said first and second carrier elements and said third ring gear element are coupled to one another, and these three elements are engageably and disengageably coupled to said input member through a second clutch, and a second brake is provided capable of holding said three elements against rotation;
   that said first ring gear element and said second ring gear element are coupled with each other, and a third brake is provided capable of holding these two elements against rotation;
   that said second and third sun gear elements are coupled with each other, and these two elements are engageably and disengageably coupled to said input member through a third clutch; and
   that said third carrier element is directly coupled to an output member.

2. The planetary gear transmission as set forth in claim 1 wherein:
   said first, second, and third planetary gear trains are disposed axially adjacent to one another; and
   said first, second, and third clutches and said first brake are disposed on one side of said three planetary gear trains in an axial direction, and said second and third brakes are disposed on the other side.

3. The planetary gear transmission as set forth in claim 2 wherein:
   said second and third clutches are each disposed at a substantially same axial position and are overlaid radially one over the other; and said first clutch and said first brake are disposed axially adjacent to each other around said second and third clutches.

4. The planetary gear transmission as set forth in claim 2 wherein:

said second and third brakes are each disposed at a substantially same axial position and are overlaid radially one over the other.

5. The planetary gear transmission as set forth in claim 2 wherein:

at least one of said first clutch and said first brake is disposed around one of said first, second, and third ring gear elements.

6. The planetary gear transmission as set forth in claim 3 wherein:

at least one of said first clutch and said first brake is disposed around one of said first, second, and third ring gear elements.

7. The planetary gear transmission as set forth in claim 1 wherein:

said first and second ring gear elements are formed in one body.

8. The planetary gear transmission as set forth in claim 7 wherein:

said first and second ring gear elements have a same number of teeth.

9. The planetary gear transmission as set forth in claim 2 wherein:

said first brake is disposed near and around said first ring gear element.

10. The planetary gear transmission as set forth in claim 2 wherein:

a member for connecting said first and second ring gear elements to said third brake is provided extending around said third ring gear element.

* * * * *